Patented Aug. 3, 1937

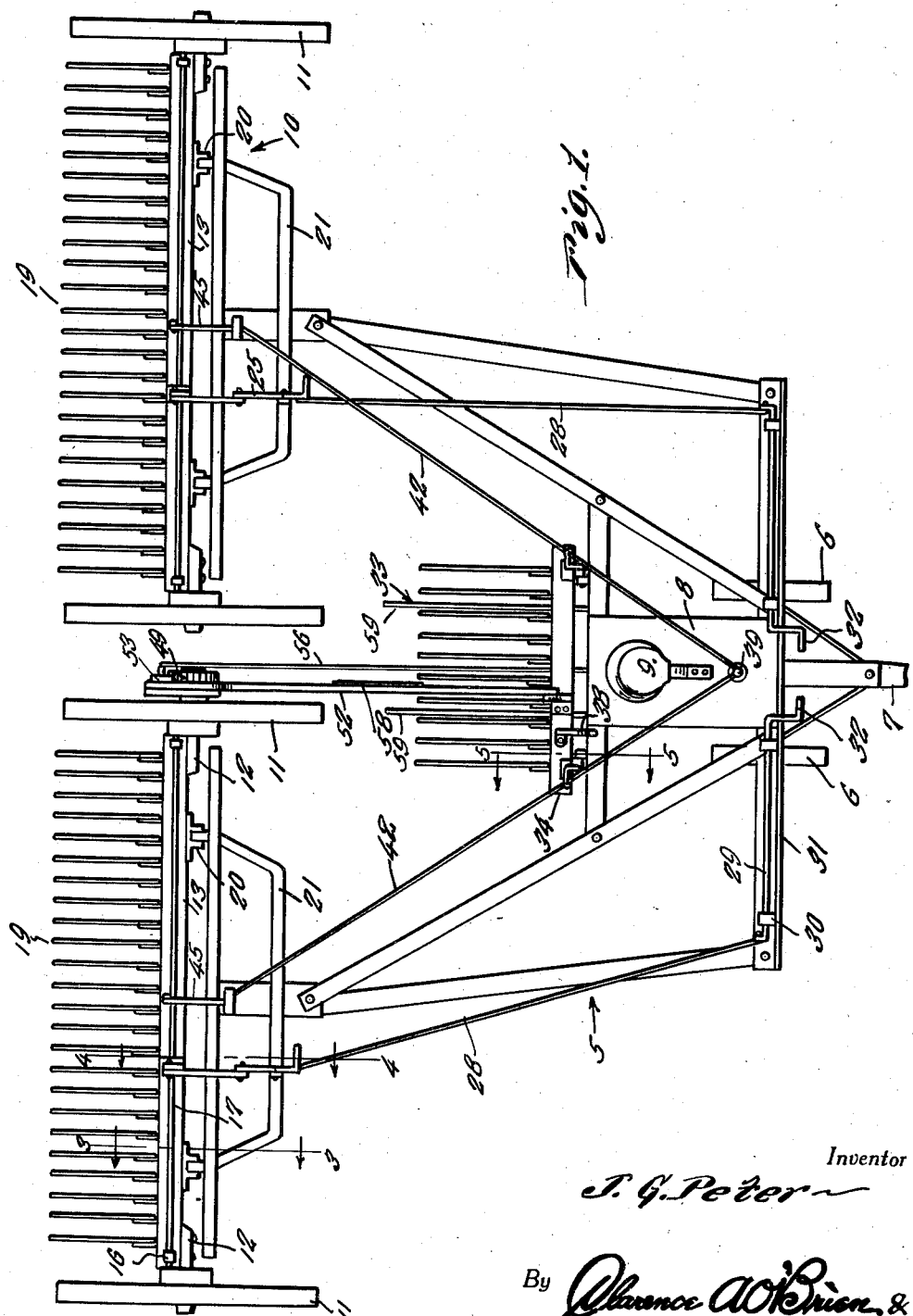

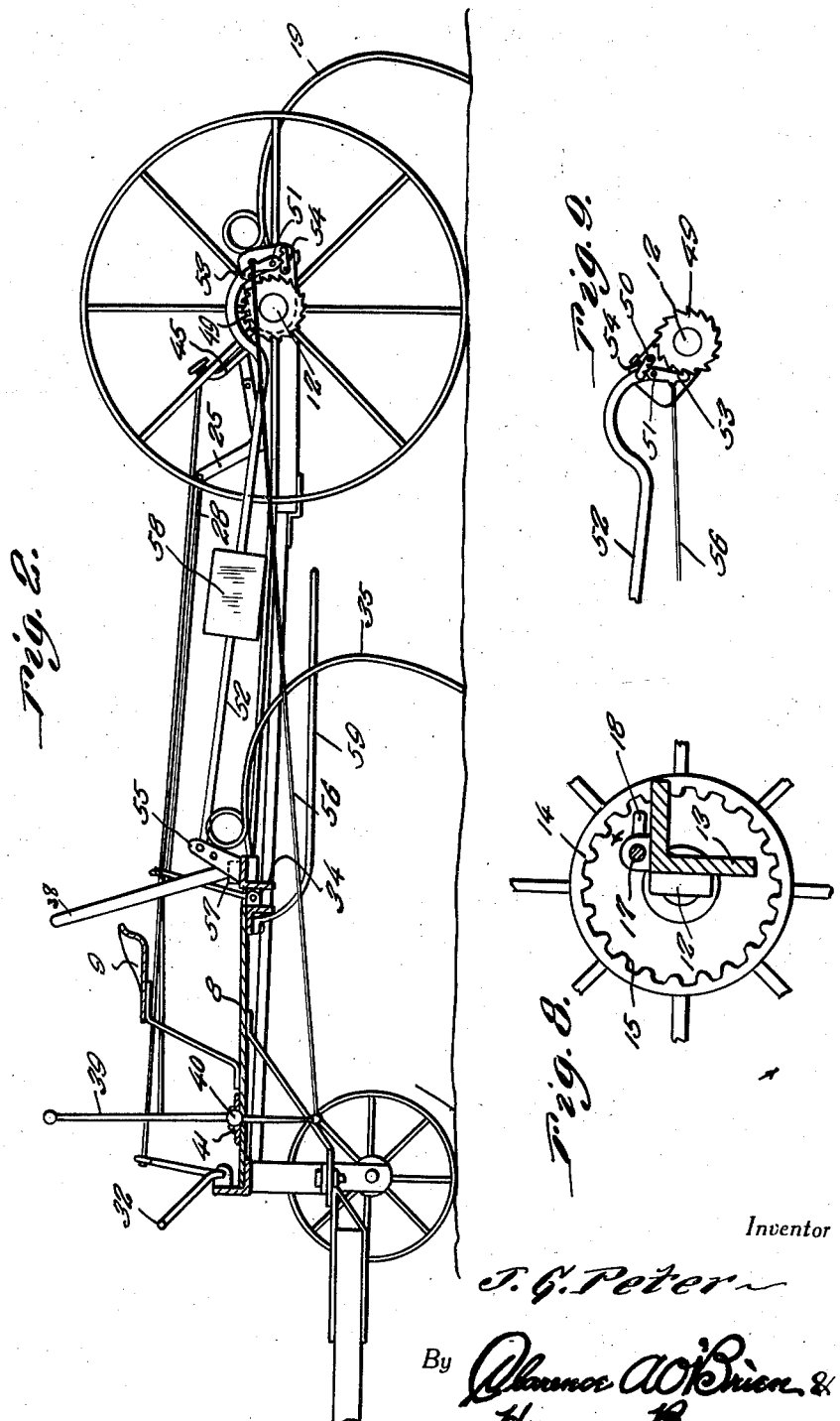

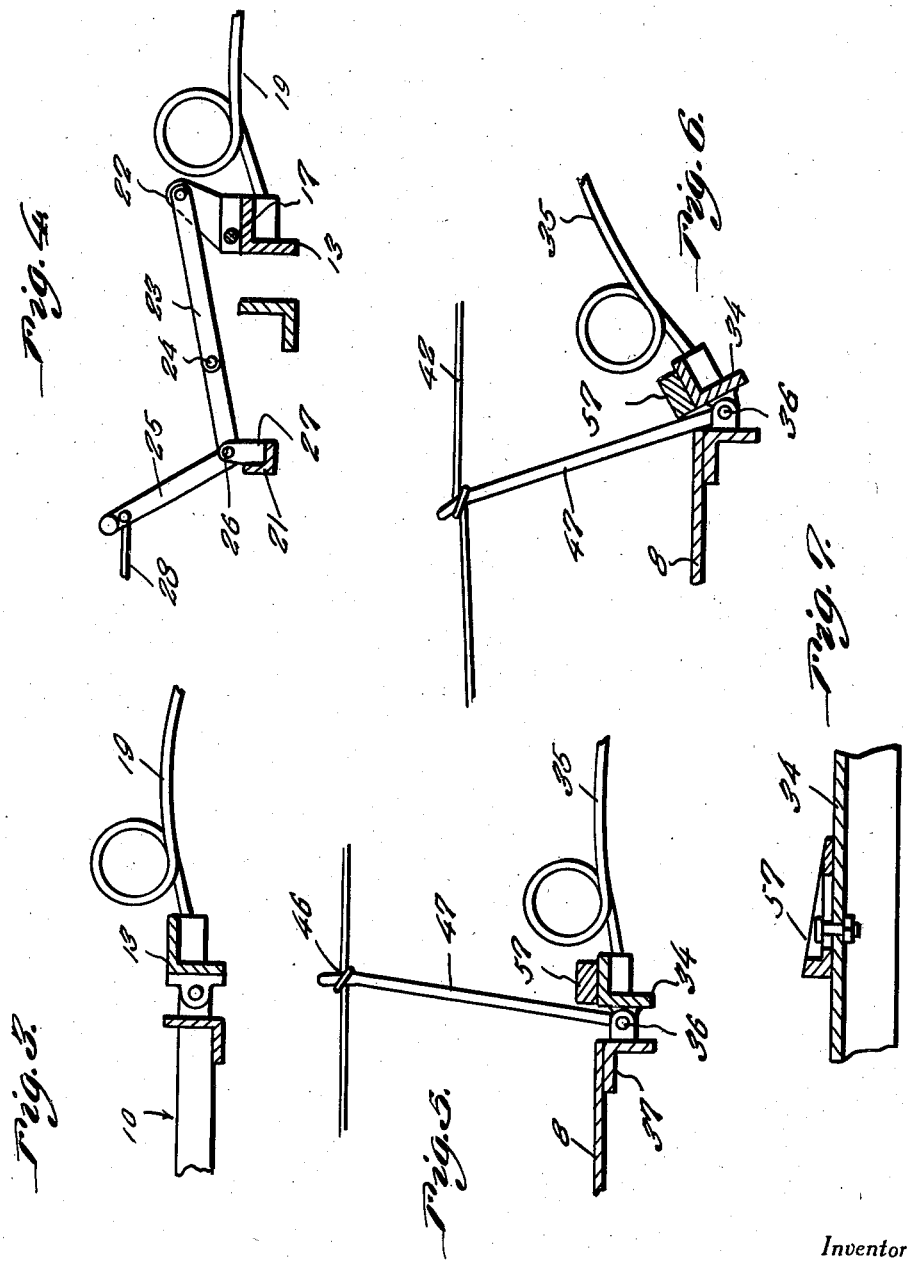

2,088,809

UNITED STATES PATENT OFFICE 2,088,809

DUMPING HAY RAKE

John G. Peter, O'Neill, Nebr.

Application August 26, 1936, Serial No. 98,052

4 Claims. (Cl. 56—391)

This invention relates to hay rakes of the types admirably adapted for use in gathering the hay and depositing the gathered hay in a windrow.

The present invention resides in the novel arrangement of side and center rakes and means for controlling the dumping of the rakes.

The invention together with its objects and advantages will be understood from a study of the following description taken in connection with the accompanying drawings wherein:—

Figure 1 is a top plan view of the rake.

Figure 2 is a longitudinal sectional view through the rake.

Figures 3, 4 and 5 are detail sectional views taken substantially on the lines 3—3, 4—4 and 5—5 respectively of Figure 1.

Figure 6 is a view similar to Figure 5 showing the position of the parts incidental to a dumping of the center rake.

Figure 7 is a fragmentary detail sectional view illustrating certain details hereinafter more fully referred to.

Figure 8 is a fragmentary detail sectional view showing the mechanism for dumping the side rakes from the traction wheel and Figure 9 is a fragmentary detail sectional view showing a portion of the mechanism for controlling the dumping of the side rakes in proper time relation to the center rake.

Referring to the drawings in detail it will be seen that the rake consists primarily of a frame indicated generally by the reference numeral 5 and provided at its forward end with wheels 6 and a tongue 7. Also at said forward end the frame 5 is equipped with a suitable platform 8 on which is mounted a seat 9 for the operator of the rake.

At the rear of the frame I provide side rake assemblies each of which is indicated generally by the reference numeral 10.

As shown each rake assembly includes a pair of traction wheels 11 which turn on stub axles 12 suitably secured to an angle bar 13.

As is somewhat conventional with these types of rake assemblies each wheel 11 is provided with a hub 14 that is provided internally with a circular series of humps or teeth 15.

Rockably mounted on the angle bar 13 through the medium of brackets 16 is a shaft 17 the respective ends of which are formed to provide dogs 18 adapted upon rocking movement of the rod 17 in one direction to engage with the humps 15 in a manner to raise the tines 19 of the rake assembly for dumping the rake.

In connection with the above it will be seen that each rake assembly also includes brackets 20 secured to the angle member 13 and pivoted to U-shaped frame sections 21 forming part of the main frame 5.

Further each rake assembly has mounted on the bar 13 thereof a lug 22 to which is pivoted one end of a link section 23 the other end of which is pivoted as at 24 to one arm of a bell crank 25 which adjacent the angle between its arms is pivoted as at 26 to a lug 27 provided on the frame member 21 as clearly shown in Figures 1 and 4.

The bell cranks 25 of the rake assemblies 10 are connected through the medium of rods 28 with one end of shafts 29 journaled in suitable brackets 30 provided on a transverse front frame member 31.

The shafts 29 at their confronting ends terminate in pedals 32 disposed within convenient reach of the feet of the occupant of the seat 9.

Further in accordance with the present invention there is provided a center and forwardly disposed rake assembly indicated generally by the reference numerals 33.

The rake assembly 33 comprises an angle bar 34 to which the tines 35 at one end are secured. Bar 34 is hinged as at 36 to a bar 37 provided at the rear end of the platform 8.

For use for dumping the rake assembly 33 there is provided a hand lever 38 that is suitably secured on the bar 34.

Also in accordance with the present invention there is provided a control lever 39 which adjacent its lower end is provided with a ball 40 that works in a suitable socket 41 provided on the platform 8 as shown in Figure 2.

Lever 39 is connected through the medium of cables 42 with the bars 13 of the rake assemblies 10 as at 45. The cables 42 at intermediate portions thereof wrap as at 46 about levers 47 suitably associated with the bar 34 of the center rake assembly 33.

From the description of the invention thus far it will be seen that to maintain the rake assemblies 10 in position so that the tines 19 thereof will gather the hay in a windrow the operator, with his feet placed on the pedals 32 presses forwardly to exert a pull on the links 28 for thereby maintaining the tines 19 in position to gather the hay.

When it is desired to swing the rake assemblies 10 upwardly for dumping the hay gathered thereby, the operator removes his feet from the pedals 32 thus releasing pressure on the shafts 29. Then the operator pushes forwardly on the lever 39 to exert a pull on the cables 42. This pull is transmitted through the connections 45 to the shafts 17 for rocking the shafts and thereby moving the ends 18 of the shafts into engagement with the humps 15. With the ends or dogs 18 of the shafts 17 thus engaged with the humps 15 the rake assemblies 10 will be caused to swing upwardly in a manner to clear the tines of the hay gathered thereby.

Further in accordance with the present invention there is provided on the axle 12 of one of the wheels 11 of a rake assembly 10 a ratchet wheel 49. Also mounted on the said one axle 12 for rotation thereabout as an axis is a block 50 to which is pivoted as at 51 the semi-circular ends of a rod 52. Also provided at the pivot 51 is a dog 53 that is disposed to engage the teeth of the wheel 49 and a suitable locking device 54 is provided for releasably holding the dog 53 out of engagement with the ratchet wheel 49 when the parts are in the position shown in Figure 2 and for securing the dog 53 in engagement with the teeth of the wheel 49 when the parts are in the position shown in Figure 9.

Rod 52 is connected in an adjustable manner and as indicated generally at 55 to the tine carrying rod 34 of the rake assembly 33. Also, and as clearly shown in Figures 2 and 9, the dog 53 is connected through the medium of a wire rod 56 with the lower end of the lever 39.

From the above it will be seen that when the lever 39 is pulled toward the occupant of the seat 9 a pull will be exerted on the rod 56 which will tend to move the dog 53 into engagement with the teeth of the ratchet wheel 49.

The ratchet wheel 49 turning with the axle 12 will cause a thrust to be exerted upon the rod 52 causing the same to move from the position shown in Figure 2 to the position shown in Figure 9. This thrust exerted on the rod 52 will cause the bar 34 of the rake assembly 33 to swing upwardly for dumping the rake 33. As rod 34 swings in this direction lugs 57 thereon will move into engagement with the aforementioned arms 47 for forcing the arms 47 from the position shown in Figure 5 to the position shown in Figure 6. Arms 47 moving in this direction will through the medium of the cables 42 exert a pull on the bars 13 of the rake assemblies 10 for swinging the bars 13 upwardly for dumping the rake assemblies 10. In this connection it will be noted that the rake assembly 33 is first dumped and the actual dumping operation of the assemblies 10 will not take place until these rake assemblies have come abreast of the hay just dumped by the assembly 33. Thus the gathered hay of the three rake assemblies will be dumped in a single windrow.

From the detailed description it will be seen that lever 39 is manipulated when all three rake assemblies are to be dumped and it is desired to delay the dumping action of the rake assemblies 10 so that the hay gathered thereby will be brought into position so as to be dumped abreast of the hay dumped by the rake assembly 33. Also it will be understood that the hand lever 38 may be used for dumping the three rakes simultaneously and when lever 38 is used it will be understood that the rake assembly 33 will deposit the hay gathered thereby in a pile forwardly of the hay deposit dumped by the rake assemblies 10. In this connection it will be understood that in using lever 38 the same is pushed forwardly thus causing the bar 34 of the rake assembly 33 to swing upwardly for dumping the rake assembly 33, and as bar 34 moves upwardly the blocks 57 thereon will engage the levers 47 for swinging the latter to a position shown in Figure 6 to dump the rake assemblies 10. The latter may be dumped independently of one another by rocking the lever 39 either to the right or left dependent upon which of the rake assemblies 10 is to be dumped. The dumping of the rake assemblies 10 individually and independently of one another will of course be accomplished without affecting the rake assembly 33.

In order to permit efficient operation of the device when the lever 39 is manipulated in a manner to obtain a delayed dumping of the rake assemblies 10 rod 52 is provided with a blade 58 that will move forwardly therewith between adjacent tines 35 of the rake assembly 33 to remove any hay between said tines as would otherwise impede the forward movement of the rod 52.

Also, if desired, and as shown, the rake assembly 33 may include cleaner rods 59 which are secured at one end to the bar 37 and project rearwardly between certain of the tines for use in removing hay that would otherwise cling to the tines.

It is thought that a clear understanding of the construction, utility and advantages of a dumping hay rake assembly embodying the features of the present invention will be had without a more detailed description.

Having thus described the invention what is claimed as new is:—

1. In an implement for raking hay, ground wheels, a pair of rear rake assemblies arranged end to end in spaced apart relation, a forward rake assembly arranged to span the space between said rear assemblies, means for dumping the forward rake assembly including a ratchet and pawl drive operative by one of said wheels and normally ineffective, a manipulative lever for rendering said drive effective, and means operative by said first mentioned means to dump said rear rake assemblies simultaneously and subsequently to the dumping of said first assembly.

2. In an implement for raking hay, ground wheels, a pair of rear rake assemblies arranged end to end in spaced apart relation, a forward rake assembly arranged to span the space between the rear assemblies, means for dumping the forward rake assembly including a ratchet and pawl drive normally ineffective and operative by one of said wheels, a manipulated lever for rendering said drive effective to dump said forward assembly, and operating connections between said forward and rear assemblies for subsequently dumping said rear assemblies simultaneously.

3. In an implement for raking hay, ground wheels, a pair of rear rake assemblies arranged end to end in spaced apart relation, a forward rake assembly arranged to span the space between the rear assemblies, means for dumping the forward assembly including a ratchet and pawl drive normally ineffective and operated by one of said wheels, a manipulative lever for rendering said drive effective to dump said forward rake assembly, operating connections between said forward and rear assemblies for subsequently dumping said rear assemblies including pick-up connections and pull cables connected to said lever for selective operation by manipulation of said lever to operate said rear assemblies independently.

4. In an implement for raking hay, ground wheels, a pair of rear rake assemblies arranged end to end in spaced apart relation, a forward rake assembly arranged to span the space between the rear assemblies, means for dumping the forward assembly including a ratchet and pawl drive normally ineffective and operated by one of said wheels, a manipulative lever for rendering said drive effective to dump said forward rake assembly, operating connections between said forward and rear assemblies for subsequently dumping said rear assemblies including pick-up connections and pull cables connected to said lever for selective operation by manipulation of said lever to operate said rear assemblies independently, a pair of pedals, and means operative by the wheels of said implement under control of said pedals to dump the rear assemblies selectively and independently of said pick-up connections and lever.

JOHN G. PETER.